(12) United States Patent
Kanevsky et al.

(10) Patent No.: US 6,603,921 B1
(45) Date of Patent: Aug. 5, 2003

(54) AUDIO/VIDEO ARCHIVE SYSTEM AND METHOD FOR AUTOMATIC INDEXING AND SEARCHING

(75) Inventors: Dimitri Kanevsky, Ossining, NY (US); Stephane H. Maes, Danbury, CT (US); Mukund Padmanabhan, Ossining, NY (US); Arthur R. Zingher, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/108,544

(22) Filed: Jul. 1, 1998

(51) Int. Cl.[7] .............................. H04N 7/04; H04N 5/93
(52) U.S. Cl. .......................................... 386/96; 386/101
(58) Field of Search .......................... 386/96, 101, 103, 386/104, 105, 106, 109, 39, 54, 75, 69; 704/278, 251, 246, 200, 200.1; H04N 5/93, 7/04

(56) References Cited

U.S. PATENT DOCUMENTS 5,617,407 A * 4/1997 Bareis
5,918,223 A * 6/1999 Blum et al.
6,336,093 B2 * 1/2002 Fasciano
6,370,504 B1 * 4/2002 Zick et al.

* cited by examiner

Primary Examiner—Robert Chevalier
(74) Attorney, Agent, or Firm—F. Chau & Associates, LLP

(57) ABSTRACT

An archive system for records with an audio component, which uses automated speech recognition to create a multi-layered archive pyramid. The archive pyramid includes successive layers of data stored at varying data rates such as original video data, compressed video data, original audio, compressed audio data, recognized word-lattices, recognized word-bags and a global word index. The disclosed system uses automatic speech recognition to transcribe from audio to searchable index layers. During a search operation, automatic and semi-automatic techniques are used to search the archive pyramid from the smallest narrowest layers to the largest widest layers, to identify a moderate subset of records. This subset is further refined by a manual survey of regenerated compressed audio. Finally, the selected records are retrieved from the original audio archive layer.

26 Claims, 4 Drawing Sheets

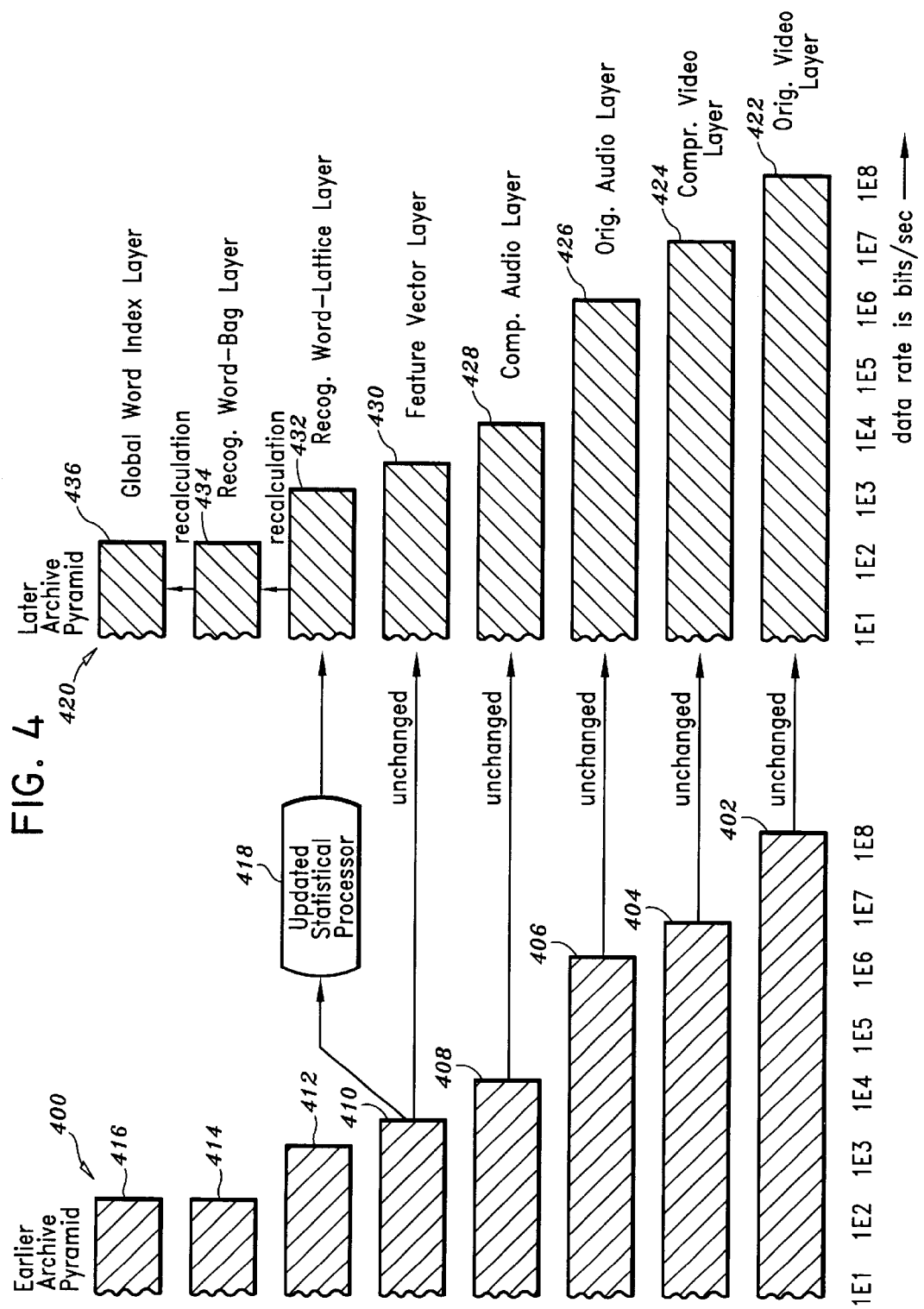

US 6,603,921 B1

AUDIO/VIDEO ARCHIVE SYSTEM AND METHOD FOR AUTOMATIC INDEXING AND SEARCHING

BACKGROUND OF THE INVENTION

1. Field of the Invention

The present invention relates generally to archiving audio records or audio/video records. This employs automatic speech recognition to transcribe from audio to at least one layer of recognized text. Subsequently, this system uses automatic and semi-automatic techniques to search through these plural archive layers.

2. Description of the Related Art

Many applications exist where audio and video content is maintained in an archive for later recall. For example, television networks generally record video tape copies of all broadcasts along with a volume of related material. This quickly accumulates into a considerable archive. At a later date, when a user needs to identify those tapes of interest, the task is formidable.

To ease the research task, such archives are generally augmented with a manually created index of topics and key words. However, such indexes can be incomplete and lead to unreliable search results. In particular, the topics and key words often change, which complicates searching through earlier records.

In order to provide a complete, searchable index of the archive, a full text transcription of each record can be generated. These transcripts can then be searched for relevant terms. However, manual transcription is a labor intensive operation, which may accumulate to a considerable expense.

In another archiving application, many service bureaus store all telephone conversations and phone mail from customers in an audio archive. An explicit summary of each record is manually generated and stored in the archive. To identify records of interest, a user can search the explicit summaries using a keyword search. However, since the summaries are manually created, many relevant records are likely to be missed due to incorrect or incomplete summaries.

In an effort to automate the transcription process for these applications, automated speech recognition (ASR) techniques have been employed. Unfortunately, with a wide range of speech pronunciation variability and audio degradation from background noise, phone lines and the like, present day ASR systems typically provide a transcription which includes many errors. Thus, the ASR transcription often requires manual correction, which is a labor intensive operation.

In currently available ASR systems, each spoken word maps to several possible candidate words with varying probabilities of a match. Current ASR uses linguistic context, and a statistical language model (based on language statistics for words, word pairs, and word triplets) to select among these candidate words. Nevertheless, these ambiguities often are resolved imperfectly.

An "utterance" is a segment of spoken speech which is acoustically and linguistically largely self-contained. For example, a clause or short sentence may form one utterance. Thus spoken speech is divided into "spoken utterances", and the corresponding recognized text is divided into "recognized utterances". Using current ASR, each spoken utterance typically translates to many tentative "recognized utterances", each with an estimated probability of matching the spoken utterance. Unfortunately, the recognized utterance with the largest estimated probability often is not an exact transcription of the spoken utterance.

Therefore, there remains a need for an improved audio/video archive system and method which provides automated indexing and searching of records having an audio component in a manner that overcomes the problems associated with a prior art.

SUMMARY OF THE INVENTION

In accordance with one form of the present invention, an archiving structure for records having an audio component includes an original audio archive layer, a compressed audio archive layer corresponding to the original audio archive layer, and at least one layer of recognized text corresponding to the original audio archive layer. The recognized text layers serve as indexes and guides for searching the original audio archive layer.

In accordance with another form of the present invention, an archiving system for records having an audio component includes: means for generating and accessing an original audio archive layer; means for generating and accessing a compressed audio archive layer corresponding to the original audio archive layer; and means for generating and accessing at least one index archive layer corresponding to said original audio archive layer.

A further embodiment of the present invention also includes means for automatically searching the index archive layer and means for refining this search by survey and selection of audio regenerated from the compressed audio layer.

In accordance with a method of the present invention, archiving of records including an audio component starts by storing the original audio in a first archive layer. From the original audio, a compressed audio archive layer is then created. Automatic speech recognition is used to create at least one layer of recognized text. In a preferred embodiment, these layers include: a global word index layer; a recognized word-bag layer containing all candidate recognized words for each spoken utterance; and a recognized word-lattices layer summarizing all candidate recognized words, how they are ordered and correlated for each spoken utterance. The archive may further include a layer of recognized words and a layer of recognized utterances.

In accordance with an archive search method of the present invention, a search is conducted in several steps. Preferably these steps include: a search of the global word index layer; then a search through the layer of recognized word-bags; and then a search through the layer of recognized word-lattices. A subset of records located by one search stage are refined by the next search stage. After these automatic search stages, the resulting subset of records is then used for a manual survey of the compressed audio archive layer. These successive refinements identify a small set of relevant records which are selectively retrieved from the original audio archive layer.

These and other objects, features and advantages of the present invention will become apparent from the following detailed description of illustrative embodiments thereof which are to be read in connection with the accompanying drawings.

BRIEF DESCRIPTION OF THE DRAWINGS

The invention will be described in detail in the following description of preferred embodiments, with reference to the following figures, wherein:

FIG. 4 is a pictorial diagram illustrating an archive updating process in accordance with the present invention.

DETAILED DESCRIPTION OF PREFERRED EMBODIMENTS

Figure 1:
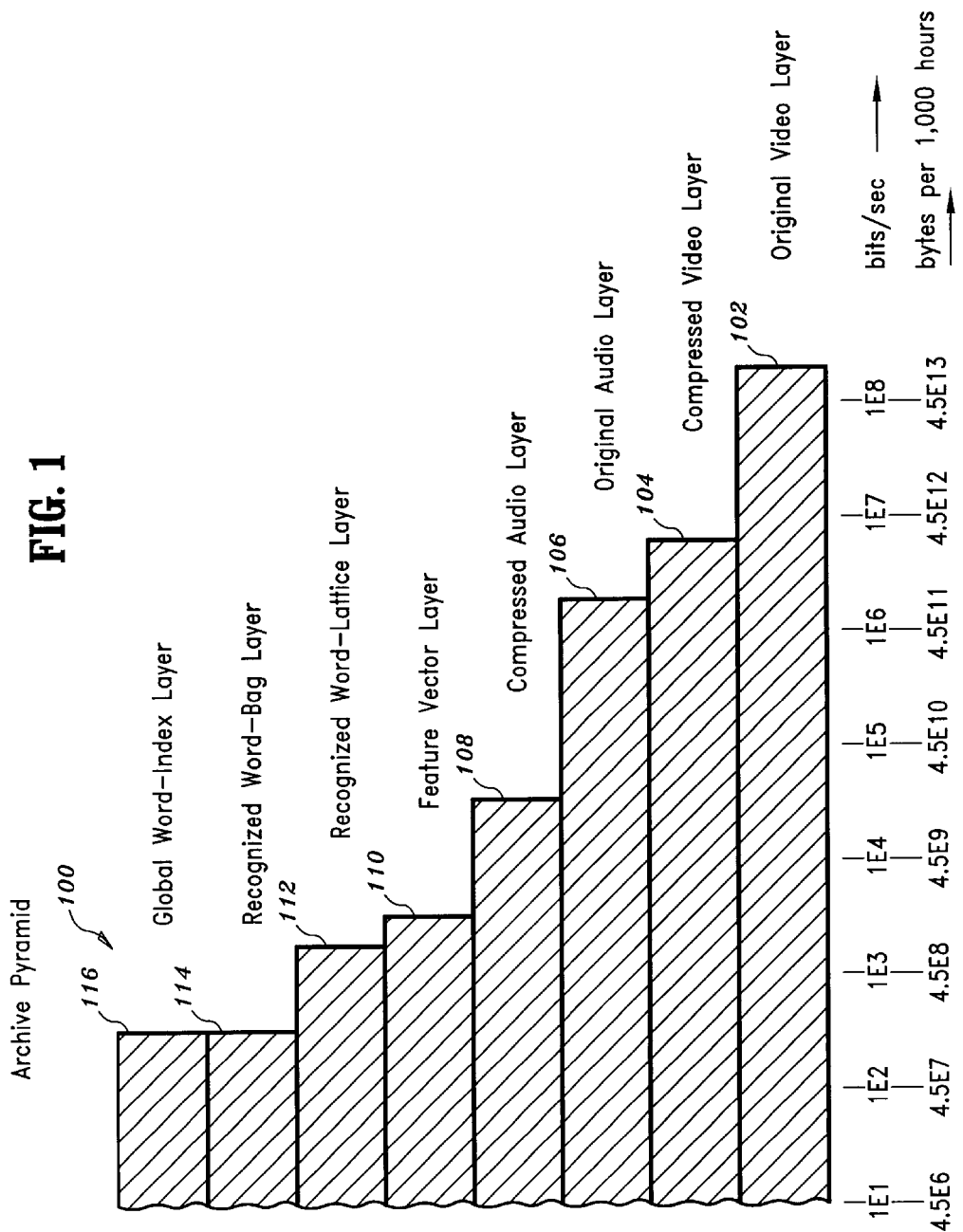
FIG. 1 is a pictorial diagram of an archive pyramid formed in accordance with the present invention.

The present invention provides an archive system and method for records which include an audio component. In many applications, the record may also include a video component. FIG. 1 illustrates an exemplary archive structure formed in accordance with the present invention. The archive structure takes the form of a plurality of layers which require varying amounts of storage capacity and access data-rate. In one embodiment, the layers include:

a layer for original video 102;

a layer for compressed video 104;

a layer for original audio 106;

a layer for compressed audio 108;

a layer for feature vectors 110;

a layer for recognized word-lattices 112;

a layer for recognized word-bags 114; and a layer for a global word index 116.

The successive layers of the archive successively diminish in data-rate and logical-size. Therefore, this archive structure is referred to as an archive pyramid 100. In FIG. 1, the horizontal length of each layer illustrates its data-rate and logical-size on a logarithmic scale. The following paragraphs describe each layer in further detail, including a representative encoding algorithm, data-rate, and logical-size for an illustrative embodiment of the present invention which includes a capacity of 1,000 hours of audio/video data.

The widest layer in the archive pyramid 100 is the original video layer 102. In one embodiment, this carries studio-quality video, with a representative data-rate of about $1.6E8$ bits/sec, and a logical-size of about $0.7E14$ bytes per 1,000 hours. From the original video layer 102, an optional compressed video layer 104 may be formed. Various compression algorithms can be employed, such as MPEG-2 compression, which has a representative data-rate about $0.6E7$ bits per second, and a logical-size about $2.7E12$ bytes per 1,000 hours.

The original audio layer 106 can be formed using many conventional encoding methods known in the art. In one embodiment, the original audio layer 106 is formed using a high-fidelity PCM encoding, with a representative data-rate about $1.4E6$ bits/sec, and logical-size about $0.6E12$ bytes per 1,000 hours.

In a preferred embodiment, the compressed audio layer 108 is suitable for input to an ASR system with almost undiminished accuracy and is also suitable for regeneration with intelligible audio quality. Various algorithms exhibit this double suitability. For example, one suitable audio compression algorithm is Adaptive Differential Pulse Code Modulation (ADPCM) with 4 bits/differential sample, at a sample rate between $8E3$ and $22E3$ samples/sec. Another suitable compression algorithm is the "Digital Speech Standard" (DSS), which is used in the Olympus D1000 "Digital Voice Recorder". DSS may be licensed via International Voice Association, (IVA), whose members include Olympus Inc., Phillips Inc., and Grundig Inc. For DSS, a representative data-rate is about $1.2E4$ bits/sec, and the logical-size is about $0.5E10$ bytes per 1,000 hours. Yet another suitable audio compression algorithm uses feature vectors, as described below.

Typically, ASR systems include an acoustic processor and a statistical processor. The input audio goes through an "acoustic processor", which typically uses a Fast Fourier Transform and other digital signal processing techniques. This produces a "feature vector" which emphasizes information useful for speech recognition, and minimizes less relevant information. One embodiment is the "Cepstra Vector"; another is the "Mel-Frequency Cepstrum Vector". Some versions are described in "Fundamentals of Speech Recognition", by Bing Hwang Juang and Lawrence Rabiner, Prentice Halls Books, 1993, page 189. The preferred embodiment of the archive pyramid 100 stores feature vectors in the feature vector layer 110. For feature vectors with appropriate encoding, a representative data-rate is about $4E3$ bits/sec, and the logical-size is about $1.8E9$ bytes per 1,000 hours.

In another embodiment, the feature vector layer also serves as the compressed audio layer. Thus, layers 108 and 110 are unified. A suitable algorithm is then used to provide regeneration from feature vectors to audio with adequate quality, such as discussed in the article entitled "Cepstral Analysis Synthesis on the Mel Frequency Scale", by Sataoshi Imai, as reported in the IEEE ICASSP "International Conference on Audio, Speech and Signal Processing", Boston, 1983.

In a later stage of ASR, the feature vectors go through a statistical processor, which compares them with prototypes for various words. While this comparison is sharpened by a statistical model of the language, nevertheless, there remains considerable ambiguity in the recognition process. Typically, one spoken utterance generates many different tentative recognized utterances, each with a probability of matching the spoken utterance. These utterances typically agree on some words, and differ on other words. This multiplicity can be summarized as a "recognized word-lattice", which is a graph, with nodes and links. Each node corresponds to a candidate recognized word. Each link corresponds to successive words in a candidate recognized utterance. Each path through this lattice corresponds to a candidate recognized utterance. Also, the recognized word lattice may include an estimated probability, or likelihood, associated with each node and each link. In one embodiment, the recognized word-lattice is stored in layer 112. This layer has a representative data-rate of about $1.6E3$ bits/sec, and has a logical-size of about $0.7E9$ bytes per 1,000 hours.

In order to facilitate searching, a recognized word-lattice can be simplified into a data structure referred to as a "recognized word-bag", which contains all words and some probabilities for the recognized word-lattice. The simplification algorithm which generates the recognized word-bags neglects various details in the recognized word-lattice, such as: word order, word correlations in a single recognized utterance, word-alternatives which differentiate recognized utterances, etc. For the recognized word-bag layer 114, a representative data-rate is about $3E2$ bits/sec, and logical-size is about $1.4E8$ bytes per 1,000 hours.

In a preferred embodiment, the top-most layer 116 is a global index of words. This layer collates all words in all recognized word-bags in the archive. For each distinct word, the global index has a link to each spoken utterance whose recognized word-bag includes that word. For the global index of words, a representative data-rate is about 3E2 bits/sec, and logical-size is about 1.4E8 bytes per 1,000 hours.

The global word index 116, word-bag layer 114 and word-lattice layer 112 are used for preliminary searching of the archive pyramid 100 and provide links to the lower, wider layers in the archive. Accordingly, these layers are generally referred to as index layers.

The logical-size of the archive layers is important when considering a system architecture. In current technology, an inexpensive Hard Disk Drive (HDD) can hold about 0.6E10 Bytes, and this is improving each year. Thus, while the original video layer 102 typically will require a storage system with much larger capacity (and much slower access) such a robotic tape library, the compressed audio layer 108, and all layers above it can be efficiently and economically stored on a HDD on a small computer. Thus these layers can be searched very conveniently to rapidly locate a moderate number of well-selected relevant records. The search and access to lower, wider layers in the archive can then be limited to these relevant records and subsets thereof. This pre-selection mitigates the slow access time for lower, wider layers in the archive.

Figure 2:
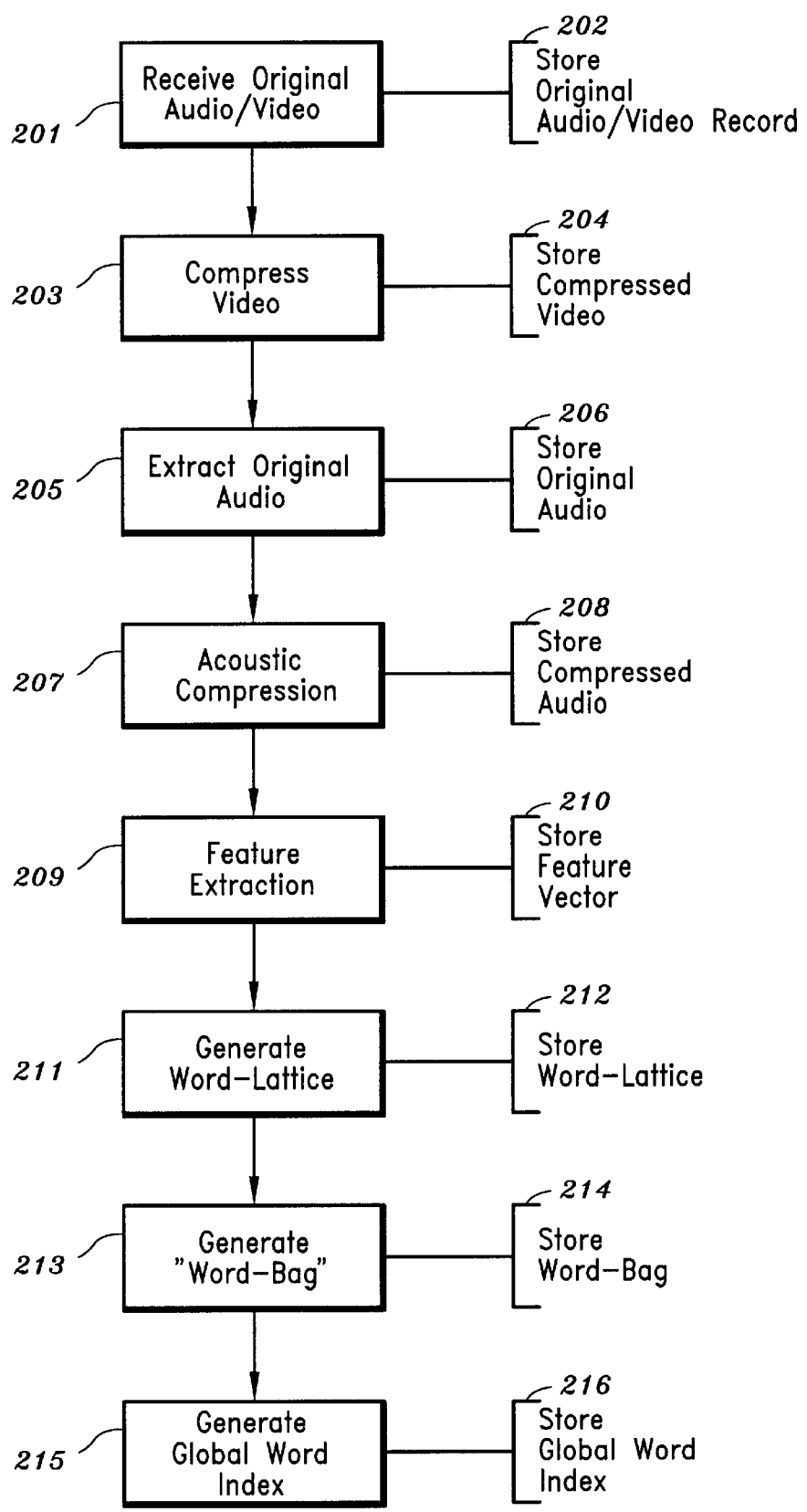
FIG. 2 is a flow chart illustrating a method of generating an archive pyramid in accordance with the present invention.

FIG. 2 is flow chart of an exemplary process followed to construct an archive pyramid in accordance with the present invention. For illustrative purposes, the original records are presumed to start as audio/video tape. The original audio/video tape is stored (step 201) in a robot tape library, referred to as the original video layer 102. A compression algorithm, such as the MPEG-2 video compression, can then be employed to produce compressed video (step 203) which is stored (step 204) in the compressed video archive layer 104. In addition, the original audio channel is extracted (step 205) and stored (step 206) in the original audio archive layer 106. An audio compression algorithm then produces compressed audio (step 207), which is stored (step 208) as the compressed audio archive layer 108.

An ASR Acoustic Processor is then used to extract feature vectors (step 209) which are stored (step 210) in the feature vector archive layer 110. Next, the ASR statistical processor produces recognized word-lattices (step 211), which are stored (step 212) in the recognized word-lattice layer 112. A simplification algorithm is then invoked to produce recognized word-bags (step 213), which are stored (step 214) in the word-bag archive layer 114.

Finally, a merge and sort algorithm produces a global word index (step 215), which is stored (step 216) as the global word index layer 116. In the preferred embodiment, the compressed audio layer 208 and all narrower, higher layers, are stored in a rapid access storage device, such as a hard disk drive.

Archive Searching

Figure 3:
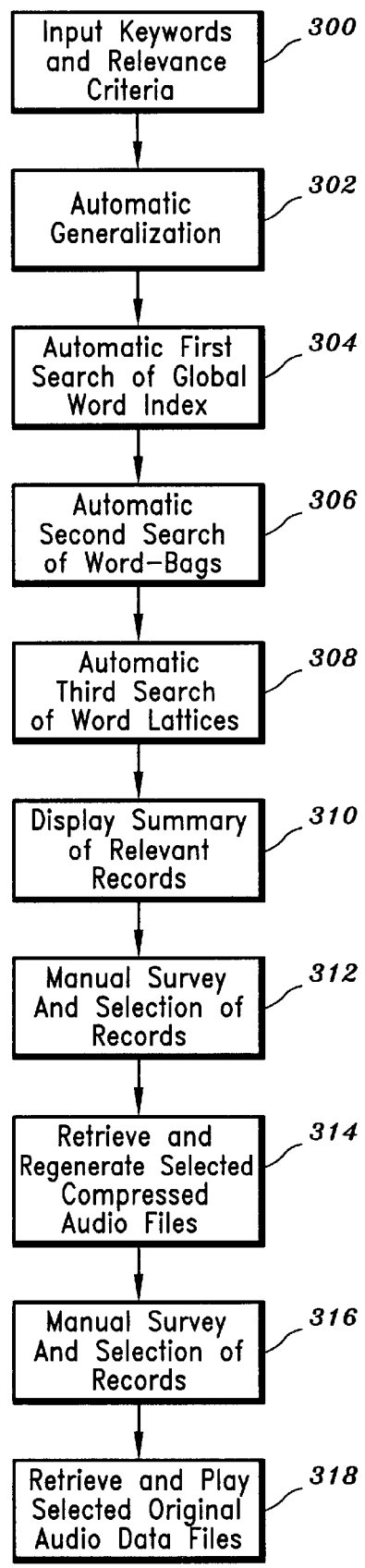
FIG. 3 is a flow chart illustrating a search method formed in accordance with the present invention.

When a user is interested in identifying and recalling records in the archive related to a topic of interest, a search of the archive pyramid 100 is initiated by the user. The process of searching the archive pyramid 100 is illustrated in the flow chart of FIG. 3. A user begins by entering search criteria, such as target-words and relevance criteria into the system (step 300). The relevance criteria can employ several concepts such as:
logical operators (e.g.: AND, OR, NOT);
acoustical concepts (e.g.: SOUNDS SIMILAR, RESEMBLES);
statistical concepts concerning ASR estimated likelihoods (eg: LIKELIHOOD, SUM, PRODUCT, MORE_THAN, LESS_THAN, STATISTICAL_WEIGHT); linguistic relations (e.g.: BEFORE, AFTER, ADJACENT, NEAR, CONTEXT); syntactic relations (e.g.: SINGULAR, PLURAL, POSSESSIVE, SAME_ROOT); and semantic relations (e.g.: EXACT, EQUIVALENT, APPROXIMATE, SIMILAR,
GENERALIZATION, SPECIALIZATION, RELEVANT, OPPOSITE,
UNRELATED);

Preferably, the system includes a software thesaurus which provides automatic generalization (step 302) from the target-words. Given one word or phrase, and given a relation, the thesaurus provides related words and phrases. Given two words or phrases, and given a relation, the thesaurus determines if these two are related.

After generalization, the system performs an automatic first search (step 304) of the global word index layer 116 of the archive pyramid 100. The first search uses the search criteria, such as described above, to identify potentially relevant records. These records are referred to as a first subset of records. In this search, only the words are evaluated, and some inter-word relationships (eg: BEFORE, AFTER) are ignored. This results in a fast, yet imprecise initial search, which may return a large number of records.

An automated second search (step 306) is then conducted using only those records identified in the first search. The system again uses the search criteria, as described above, but now searches through the recognized word-bag layer 114. This search can be more elaborate and yield more accurate results since there are fewer records to evaluate and because the recognized word-bag layer 114 includes certain inter-word relationships. (For example, relationships OR, AND, CONTEXT are indicated, but relationships BEFORE, AFTER and ADJACENT are ignored). Through the second search, the system further refines the number of relevant records, generating a second subset of records.

The second subset of records is further refined by a third search (step 308). The third search is an automatic search, limited to the second subset of records, which applies the search criteria to the recognized word-lattice layer 112. This search can a more detailed selection process, both because there are fewer records, and because each record is more complete. This may counteract ASR errors, because the lattice includes many candidate recognized utterances. Also this enables powerful generalization, because the search criteria may include relationships and thesaurus. The third search produces a third subset of records. With proper search criteria, the number of records in the third subset is manageable, and each record has significant probability of being useful.

Once the automatic searches are completed, the resulting third subset of records is displayed automatically (step 310). More precisely, for each record in the third subset, the system displays its corresponding recognized word-lattice. For example, given a word-lattice, a computer can generate and display an image which shows words and the links between them. The visual summary is generated dynamically for each record was based on the word-lattices. Thus it is not previously generated and not explicitly stored. The user reviews this visual summary and manually selects those records that appear most relevant (step 312). The records selected by the user form a fourth subset of records. Alternatively, after reviewing the summary, the user may elect to modify the original search criteria and restart the search.

Those records in the fourth subset of records are retrieved from the compressed audio layer 108 and are regenerated into intelligible audio (step 314). The user then surveys the audio record to determine if the record is desired (step 316). The audio survey of the compressed audio records can be accelerated by faster regeneration of the record. For example, some pauses and prolonged sounds can be shortened during this process while intelligibility is maintained. During the manual surveying process, the user selects or rejects the record. This refinement creates another subset of records, referred to as selected records.

Finally, the selected records are retrieved (step 318) from the original audio layer 106 (and, where applicable, the original video layer 102) of the archive pyramid 100. Thus, by refining the search in successive layers through the archive pyramid 100, an efficient search is achieved. While each successive layer requires additional access time and bandwidth, this is compensated for by the reduced number of records searched in each successive layer. In addition, by employing manual survey and selection steps in the search process, errors introduced by the ASR system are mitigated and accurate, comprehensive search results are attained.

Archive Updating and Downgrading

ASR technology is improving from year to year. As this occurs, the ASR algorithms employed in the present archive system can be updated and the new algorithms can be used to revise some of the archive layers of existing records. Some examples of potential updates are: updated audio compression to tighten compression; updated acoustic processor to improve robustness against noise; and updated statistical processor to improve recognition accuracy via better acoustic prototypes or better linguistic statistics.

For example, FIG. 4 illustrates the effects of an updated statistical processor 418 and the resulting relationship between an earlier archive pyramid 400 and a later archive pyramid 420. Below the level of the upgrade the archive pyramid is not altered. Accordingly, the original video layer 402, compressed video layer 404, original audio layer 406, compressed audio layer 408 and feature vector layer 410 remain unchanged.

The updated statistical processor 418 generates a new layer of recognized word lattices 432. From this, the system generates a new recognized word-bag layer 434 and a new global word index layer 436. The new layers (432, 434, 436) in the later archive pyramid (420) are different and better than corresponding layers (412, 414, 416) of the earlier archive pyramid (400). One skilled in relevant arts can readily generalize FIG. 4 for improvements in other algorithms in the system. Thus, when updated and improved algorithms become available, the archive pyramid 100 can be updated and improved. Typically, the updating process can be done with low priority, when the system is lightly loaded. Thus, revising old records does not significantly degrade the processing of new records. In many case, this updating can occur without reprocessing the wider layers of the pyramid.

In some applications, when records are very rarely used, and become older, then they may be downgraded in the archive. In one embodiment, such older files are migrated to an additional archive layer which has more storage capacity but slower access. For example, in the service bureau application, the original audio is retained for two years after it was last accessed. After this time, this data is migrated to a slower archive layer and only the compressed audio is retained in the main archive. For video applications there may be several levels of compression. Older files with wider data rates are further compressed to files with narrower data rates. Also, the older files are migrated to a larger, slower additional archive layer.

An archive system for records including an audio component, formed in accordance with a present invention provides a multi-layered archive pyramid which facilitates efficient searching. Searching is conducted from the narrowest layer in the archive pyramid to the widest layer in the archive pyramid with increased selectivity through successive layers. After automatic searching has efficiently refined the number of relevant records, a manual survey operation is performed to select the desired records from a small subset of total records. Manual transcription is avoided. Instead, automatic speech recognition is used to transcribe from audio to recognized utterances and recognized words. Subsequently, these layers are searched by automatic and semi-automatic techniques.

Having described preferred embodiments of the present invention, it is noted that modifications and variations can be made by persons skilled in the art in light of the above teachings. It is therefore to be understood that changes may be made in the particular embodiments of the invention disclosed which are within the scope and spirit of the invention which is outlined by the appended claims.

What is claimed is:

1. An archived structure for records having an audio component, the archive structure comprising:
   an original audio archive layer;
   a compressed audio archive layer corresponding to the original audio archive layer;
   at least one index archive layer generated by performing automatic speech recognition of said compressed audio archive layer, wherein said at least one index archive layer corresponds to said compressed audio archive layer and said original audio archive layer and wherein said at least one index archive layer includes at least one layer of recognized utterances.

2. The archive structure as defined by claim 1, wherein said at least one layer of recognized utterances further includes at least one of:
   a recognized word-lattices layer;
   a recognized word-bags layer; and
   a global word index layer.

3. The archive structure as defined by claim 1, wherein the records include a video component, the archive structure further comprising:
   an original video archive layer; and
   a compressed video archive layer corresponding to the original video archive layer.

4. An archiving system for records having an audio component, the archiving system comprising:
   means for generating and accessing an original audio archive layer;
   means for generating and accessing a compressed audio archive layer corresponding to the original audio archive layer; and
   means employing automatic speech recognition for generating and accessing at least one index archive layer corresponding to said original audio archive layer and said compressed audio archive layer.

5. The archiving system as defined by claim 4, wherein said means for generating at least one index archive layer includes means for generating a layer of recognized utterances.

6. The archiving system as defined by claim 5, wherein said layer of recognized utterances further comprises at least one of a layer of recognized word-lattices, a layer of recognized word-bags, and a global word index layer.

7. The archiving system as defined by claim 4, further comprising:
   means for generating and accessing an original video archive layer; and
   means for generating a compressed video archive layer corresponding to the original video archive layer.

8. The archiving system as defined by claim 7, wherein:
   said means for generating and accessing an original audio archive layer and said means for generating and accessing an original video archive layer include a robotic tape library and;
   said means for generating and accessing at least one index archive layer include a hard disk drive.

9. The archiving system as defined by claim 4, further comprising:
   means for automatically searching said at least one index layer to identify relevant records; and
   means for recalling and surveying said identified relevant records from said compressed audio archive layer.

10. The archiving system as defined by claim 9, wherein said means for automatically searching includes:
    means for receiving search input criteria; and
    means for generalizing said search input criteria.

11. The archiving system as defined by claim 10, wherein said means for generalization includes a computer-based thesaurus.

12. The archiving system as defined by claim 4, wherein said means for generating and accessing said at least one index archive layer is updatable and includes means for updating at least a portion of the archive structure.

13. The archiving system as defined by claim 4, further comprising means for downgrading a record in an archive structure.

14. The archiving system as defined by claim 13, wherein said means for downgrading a record includes:
    means for determining a last access of a record in the archive; and
    means for downgrading a record in an archive when a predetermined time has passed since said last access.

15. A method of archiving records including an audio component comprising the steps:
    storing original audio records in an original audio archive layer;
    generating and storing a compressed audio archive layer corresponding to said original audio archive layer;
    generating an index archive layer by performing automatic speech recognition of said compressed audio archive layer, wherein said index archive layer corresponds to said compressed audio archive layer and said original audio archive layer and wherein said step generating an index archive layer, further comprises the step of generating a layer of recognized utterances.

16. The method of archiving as defined by claim 15, wherein said layer of generating a layer of recognized utterances step further comprises the step of generating a layer of recognized word-lattices.

17. The method of archiving as defined by claim 15, wherein said layer of generating a layer of recognized utterances step further comprises the step of generating a layer of recognized word-bags.

18. The method of archiving as defined by claim 15, wherein said layer of generating a layer of recognized utterances step further comprises the step of generating a global word index layer.

19. The method of archiving as defined by claim 15, further comprising the step of searching the index layer to identify relevant records.

20. The method of archiving as defined by claim 19, wherein said searching step includes the steps:
    receiving search input criteria;
    generalizing said search input criteria; and
    applying the generalized search criteria to a search of said index layer.

21. The method of archiving as defined by claim 20, wherein said index layer includes a layer of recognized word-lattices, a layer of recognized word-bags; and a global word index layer, and wherein said search step includes the steps:
    searching the global word index and identifying a first subset of records;
    searching said first subset of records in the recognized word-bag layer to identify a second subset of records;
    searching said second subset of records in the recognized word lattice layer to identify a third subset of records; and
    manually surveying said third subset of records to identify said relevant records.

22. The method of archiving as defined by claim 21, wherein said manual surveying step includes the steps of:
    viewing a visual summary of the records in the third subset of records to identify a fourth subset of records; and
    regenerating the records in the fourth subset of records from said compressed audio layer and audibly surveying the records in the fourth subset of records to identify said relevant records.

23. The method of archiving as defined by claim 15, further comprising the steps:
    generating a layer of recognized word-lattices;
    generating a layer of recognized word-bags; and
    generating a global word index layer;
    receiving search input criteria;
    generalizing said search input criteria;
    searching the global word index and identifying a first subset of records;
    searching said first subset of records in the recognized word-bag layer to identify a second subset of records;
    searching said second subset of records in the recognized word lattice layer to identify a third subset of records;
    viewing a visual summary of the records in the third subset of records to identify a fourth subset of records; and
    regenerating the records in the fourth subset of records from said compressed audio layer and audibly surveying the records in the fourth subset of records to identify said relevant records.

24. The method of archiving as defined by claim 15, further comprising the step of downgrading infrequently accessed records in the archive.

25. The method of archiving as defined by claim 15, further comprising the step of upgrading said index layer after said step of generating an index layer.

26. An archiving system for records having an audio component, the archive system comprising:
    means for generating and accessing an original audio archive layer;
    means for generating and accessing a compressed audio archive layer corresponding to the original audio archive layer;
    means for employing automatic speech recognition for generating and accessing at least one index archive layer corresponding to said original audio archive layer; and
    means for downgrading a record in an archive structure.

* * * * *